Nov. 13, 1951     J. F. BICEK     2,575,253
VAGINAL SPECULUM
Filed May 16, 1949
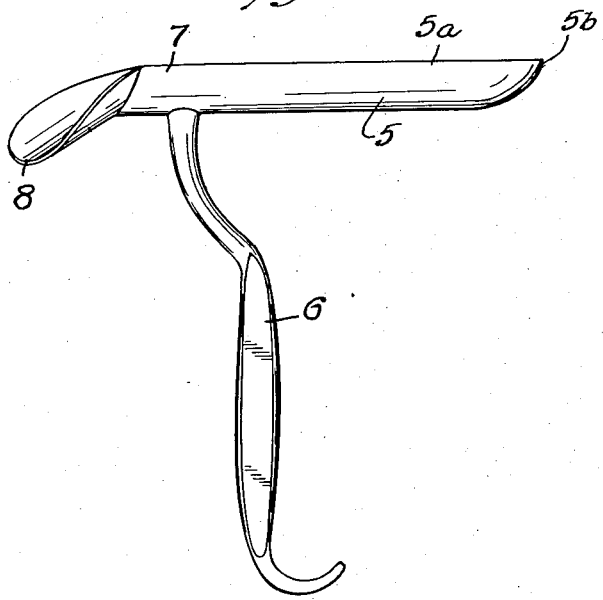
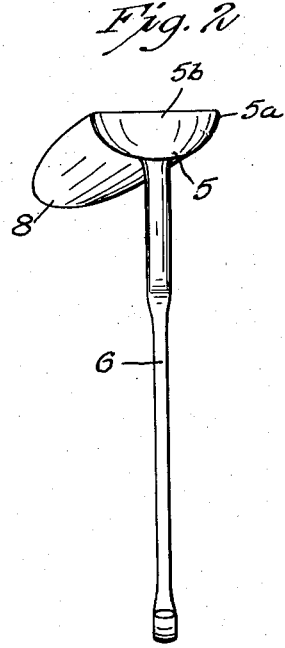
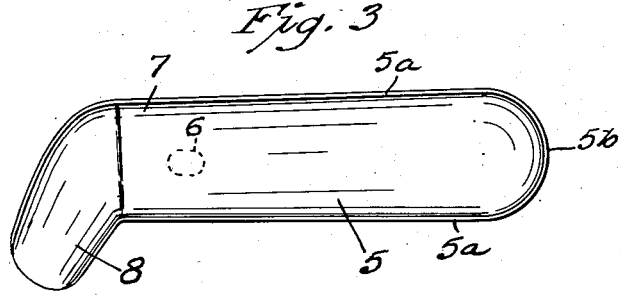
Inventor
Joseph F. Bicek
By John E. Stryker
Attorney Patented Nov. 13, 1951

2,575,253

UNITED STATES PATENT OFFICE 2,575,253

VAGINAL SPECULUM

Joseph F. Bicek, St. Paul, Minn.

Application May 16, 1949, Serial No. 93,589

2 Claims. (Cl. 128—3)

This invention relates to a vaginal speculum which is particularly, although not exclusively, adapted to facilitate the retrieving of uterine and cervical tissue for microscopic diagnosis.

It is an object of my invention to provide an improved surgical instrument of this class which combines in a unitary structure a blade and handle adapted for use as a speculum and an extension of the blade projecting above and rearwardly of the handle and terminating in a discharge spout from which the removed tissues may be retrieved readily.

The invention will be best understood by reference to the accompanying drawing which illustrates, by way of example and not for the purpose of limitation, a preferred embodiment of my invention.

Referring to the drawing:

Figure 1 is a side elevational view of my improved speculum;

Fig. 2 is a front end elevational view of the same, and

Fig. 3 is a top plan view of the same.

In the drawing the numeral 5 indicates the elongated blade of the instrument which is of the required concavo-convex shape having sides 5a and an end 5b curved upwardly to form an open top channel of somewhat greater depth than those of ordinary speculae. A rigid handle 6 extends downwardly from the blade 5 near its rear end, the axis of this handle being substantially perpendicular to the bottom of the blade. Projecting rearwardly from the handle 6, in straight line continuation of the blade 5, is an upwardly open channel member 7 terminating in a laterally projecting delivery spout 8. This channel and spout are adapted to conduct the removed tissues to a suitable receptacle (not shown) from which they may be removed and then screened and subjected to microscopic examination and diagnosis.

Since the channel member 7 and spout 8 are disposed respectively in straight line continuation and laterally below the normal line of vision over the upper surface of the blade 5, these tissue conducting members do not interfere with the normal use of the speculum. With conventional speculae such tissues and fluids as are discharged from the proximal end of the blade pass downward through a channel in the handle or over and upon the hands of the operator. Consequently, with the ordinary speculae it is difficult to retrieve the tissues for screening and diagnosis and they are usually lost. This difficulty is aggravated by the fact that the patient is usually in such a position that the lower end of the passage through the instrument handle is obstructed by the patient's body and is, therefore, inaccessible for retrieving the tissues delivered therefrom. By my arrangement of the delivery spout 8 such difficulties are overcome and the tissues conducted from the proximal end of the blade 5 may be retrieved easily by simple manipulation of the speculum while a suitable receptacle is placed or held under the spout 8. The flow of the tissues may be facilitated by the use of a small gauze pledget. It will be evident that, when in use, the member 7 and spout 8 are readily accessible, being disposed to carry the removed tissues toward the operator and away from the perineum.

Having described my invention, what I claim as new and desire to protect by Letters Patent is:

1. A vaginal speculum comprising, a blade having an elongated concave upper surface, a handle depending from said blade near an end thereof, said blade and handle having longitudinal axes disposed in a common plane and a delivery spout extending in continuation of said end of the blade rearwardly beyond said handle from the blade and to one side of said plane whereby tissues may be discharged from said spout into a receptacle positioned laterally of said plane and handle.

2. A vaginal speculum comprising, a blade having an elongated concave upper surface, a handle depending from said blade near the proximal end thereof and a delivery spout extending in continuation of said end of blade rearwardly beyond the handle from said blade and downwardly and laterally at one side of the blade and handle whereby tissues may be discharged from the rear end of said spout into a receptacle positioned laterally and rearwardly of said blade and handle.

JOSEPH F. BICEK.

REFERENCES CITED

The following references are of record in the file of this patent:

"Standard Surgical Instruments," a catalog issued by the Kny-Scheerer Corporation, New York, New York; 22nd edition; pages 5199–5201. (Copy in Div. 55.)